United States Patent [19]
Dom et al.

[11] 3,807,453
[45] Apr. 30, 1974

[54] SINGLE LEVER MIXING FAUCET

[75] Inventors: John A. Dom, Glendora, Calif.; Clarence B. Hindman, Morgantown, W. Va.; Pericles A. Argyris, Morgantown, W. Va.; John J. Kramer, Morgantown, W. Va.

[73] Assignee: Rockwell Manufacturing Company, Pittsburgh, Pa.

[22] Filed: Aug. 15, 1972

[21] Appl. No.: 280,842

[52] U.S. Cl............. 137/625.17, 137/359, 251/174
[51] Int. Cl............................................ F16k 11/02
[58] Field of Search......... 137/625.17, 636.2, 636.3, 137/636.4, 359; 251/174

[56] References Cited
UNITED STATES PATENTS

| | | | |
|---|---|---|---|
| 2,977,987 | 4/1961 | Maynard | 137/625.17 |
| 2,977,988 | 4/1961 | Drobilits et al. | 137/625.17 |
| 2,556,780 | 6/1951 | Shyrock | 137/625.17 |
| 3,202,181 | 8/1965 | West | 137/625.17 |
| 3,168,112 | 2/1965 | Klingler | 137/625.17 |
| 3,190,306 | 6/1965 | Staat et al. | 137/636.2 X |
| 3,421,540 | 1/1969 | Fulton et al. | 137/636.4 X |
| 3,448,755 | 6/1969 | Symmons | 137/539 X |

*Primary Examiner*—William R. Cline

[57] ABSTRACT

A mixing faucet for use in producing single faucet kitchen deck units, centerset lavatory units, and bath tub units comprising a one-piece valve body defining a main through bore intersected inwardly from one end by spout outlet passage means and inwardly from the other end by diametrically opposed inlet cross passages opening into the main through bore and through the peripheral body wall and a spindle valve member having a coaxial blind bore plugged at its open end to serve as a mixing chamber rotatably and axially movably mounted in the valve body main through bore by resilient seal rings disposed to sealingly cooperate with the valve body through bore outwardly beyond the intersecting outlet passage means and the diametrically opposed inlet cross passages, respective spring biased, resilient seal assemblies including sleeve-like seals the abutment ends of which are contoured to sealingly engage the spindle valve peripheral wall and the opposite ends of which are peripherally flanged to sealingly cooperate with the walls of the valve body opposed inlet cross passages so as to serve as fluid conduits between the respective inlet passages and the mixing chamber of the spindle valve member. The resilient seal assemblies include spring abutment plugs threaded into the outer ends of the valve body opposed inlet cross passages rendering them readily accessible for servicing and replacement without disassembly of the faucet. One end of the spindle valve member protrudes from the valve body through bore and fixedly mounts an operating mechanism rotatably and axially slidably supported on the adjacently related end of the valve body adapting the operating mechanism for servicing and replacement without disassembly of the faucet.

13 Claims, 13 Drawing Figures

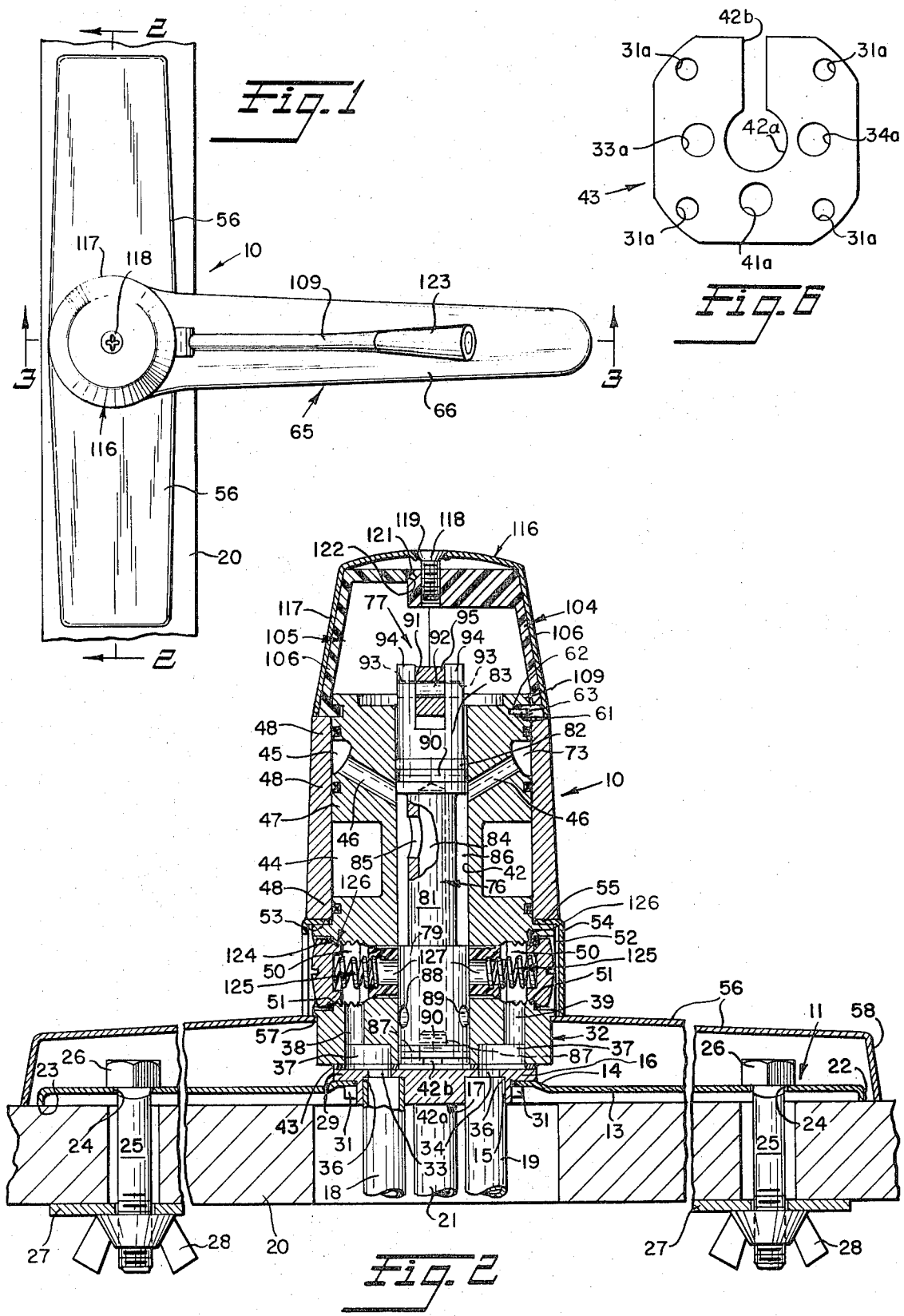

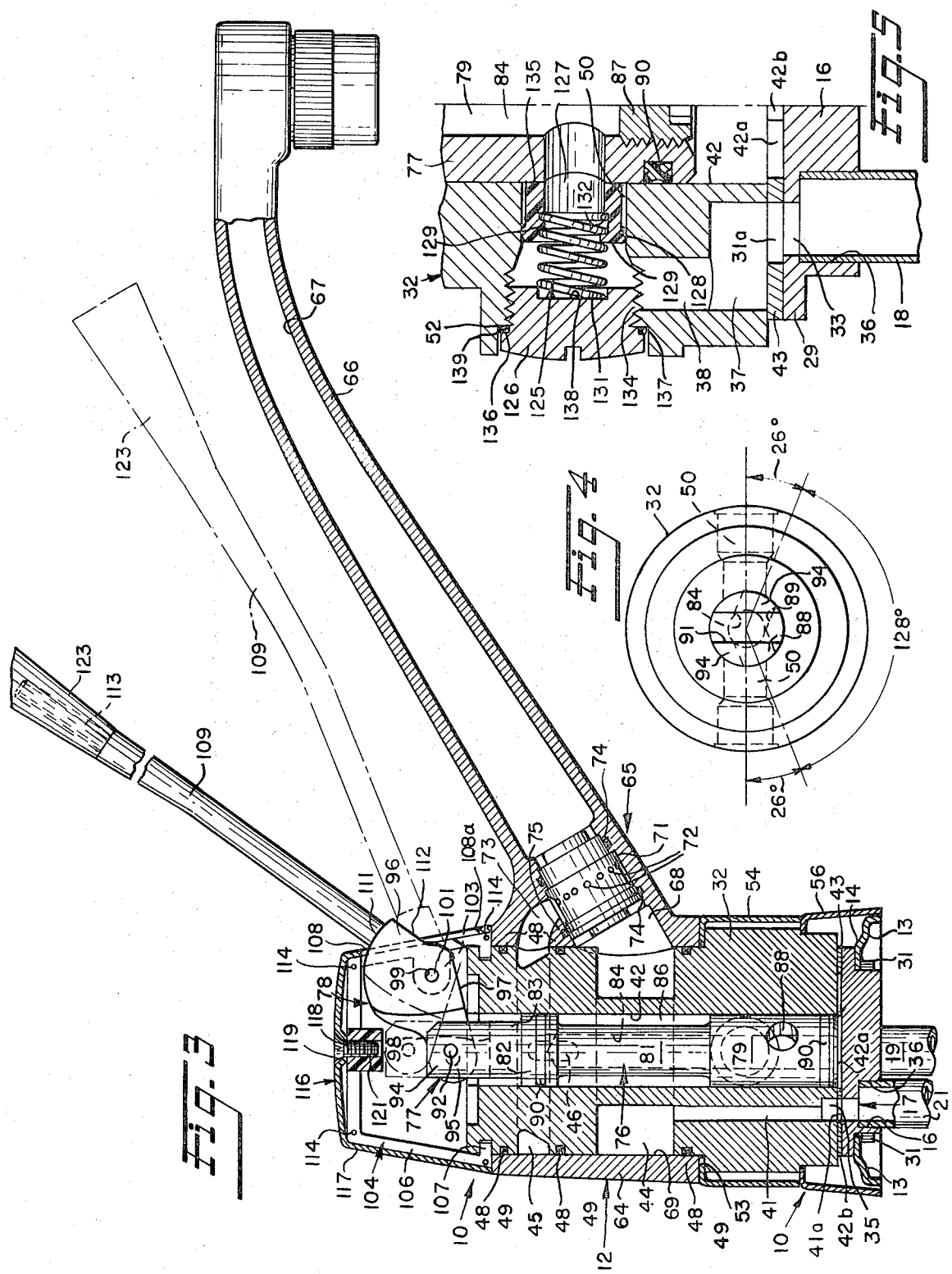

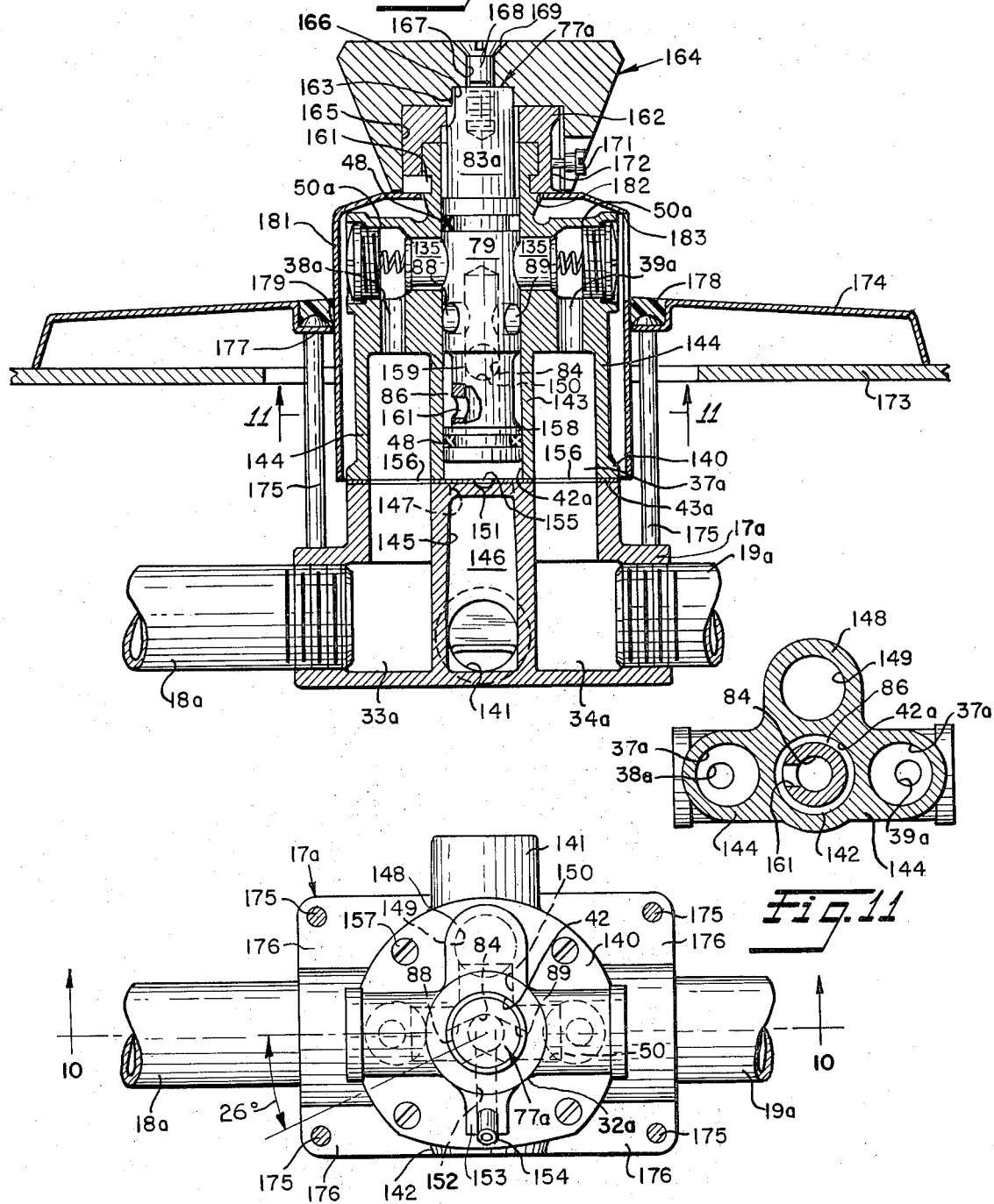

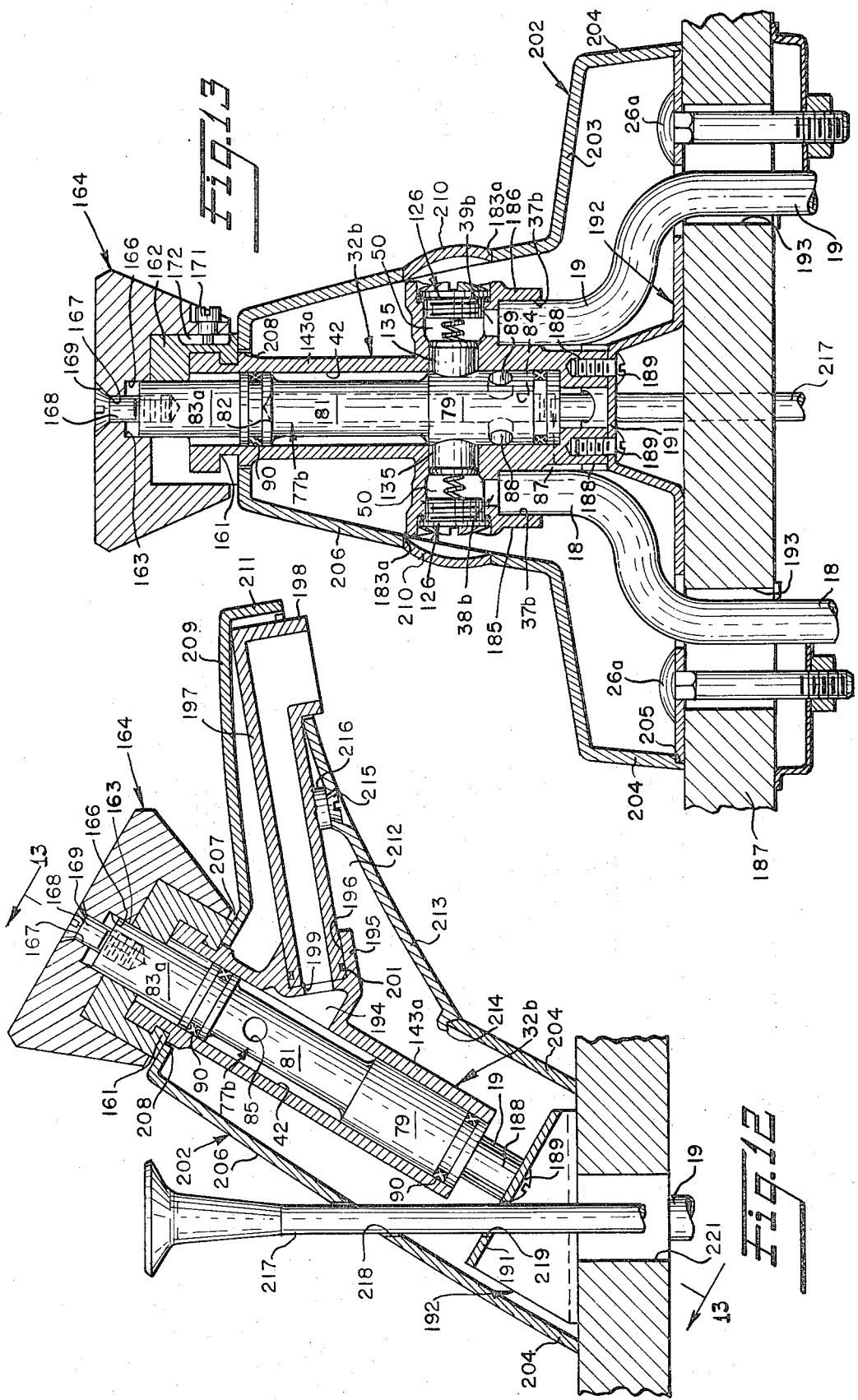

SINGLE LEVER MIXING FAUCET

BACKGROUND OF THE INVENTION

The present invention relates to improvements in mixing faucets of the type exemplified by United States Letters Patent to A. M. Moen Nos. 2,943,792, 2,975,806 and 2,978,917 issued respectively on July 5, 1960, Mar. 21, 1961, and Apr. 11, 1961, M. E. Drobilits et al No. 2,977,988 issued Apr. 4, 1961, O. V. Page No. 2,987,079 issued June 6, 1961, and Russell No. 3,012,582 issued Dec. 12, 1961. More particularly the invention is directed to a simplification of the general type of faucet depicted by the aforesaid patents to provide a faucet wherein the valve member comprises a one piece spindle valve member rotatably and axially shiftably mounted in the through bore of a one piece valve body by quad rings mounted in ring grooves formed in the opposite ends of the peripheral wall of the valve member to effectively seal the valve member against endwise leakage relative to the valve body through bore. The valve body is internally ported inwardly from one end to provide axially directed hot and cold water inlet passages opening through the one end and intersecting diametrically opposed, stepped, cross passages intersecting the axial through bore and opening through the valve body outer wall so as to mount seal assemblies readily accessible from the exterior of the valve body for servicing without disassembly of the faucet and is formed inwardly from its other end with outlet passage means which is in fluid communication with a blind, coaxial bore plugged to form a mixing chamber within the spindle valve member through a cross passage in the spindle valve member which intersects the blind bore adjacent its inner end. The operating mechanism for the spindle valve comprises an actuator member fixed to the upper protruding end of the spindle valve member and supported on the adjacently related end of the valve body to provide limited rotational and axial movement to the spindle valve member.

The outlet passage means communicates directly with the spout outlet in all forms of the invention and, in the kitchen deck unit and the bath tub unit includes an axially directed passage in the valve body angularly offset from the hot and cold water inlet passages and opening through the one body end to discharge into a supply pipe connector adapter which includes respective hot and cold water inlet passages formed to receive hot and cold water supply pipes and respectively provides outlet passage means for supplying a kitchen sink spray head and a common outlet passage means supplying the tub spout from one end and the tub shower head from the other end.

SUMMARY OF THE INVENTION

It is a primary object of the present invention to provide a mixing faucet wherein the valve body is a one piece elongated member providing a through bore, diametrically opposed hot and cold water inlets respectively including a first passage intersecting the valve body through bore and the valve body exterior wall and a second passage intersecting a respective first passage and opening through one end of the valve body, oulet passage means intersecting the valve body through bore inwardly from the other end of the valve body and axially spaced from the opposed inlet passage intersections with the through bore, a one piece spindle valve member rotatably and slidingly mounted in the valve body through bore by resilient seal rings mounted in ring grooves disposed inwardly of its opposite ends and axially spaced along the spindle valve member to respectively cooperate with the valve body through bore outwardly of the points of intersection of the diametrically opposed hot and cold water inlet intersections with the valve body through bore and outwardly of the intersection of the outlet passage means with the valve body through bore, the spindle valve member including a blind coaxial bore plugged at its outer end to form a mixing chamber and intersecting cross passages defining an included angle substantially less than 180° disposed inwardly from the plugged end and opening through the spindle valve member peripheral wall at a point such that the intersecting cross passages progressively pass the opposed first valve body passages as the spindle valve member is shifted axially toward its full volume open position, and respective seal assemblies mounted in the first passages of the diametrically opposed hot and cold water inlets and including spring biased, sleeve-like seal members having ends contoured to sealingly abut the spindle valve member peripheral wall inwardly of the seal rings mounting the spindle valve member to form conduits for delivering varying mixtures of water between full cold and full hot to the cross passages of the spindle valve member depending upon the axial and angular adjusted positions of the spindle valve member.

A further object of the present invention resides in providing the mixing faucet of the preceeding object with operating means including a control member fixedly connected to the end of the spindle valve member remote from the plugged end, a journal member fixed against axial movement to the adjacently related end of the valve body, and means interconnecting the control member and journal member to limit the axial movement of the spindle valve member relative to the valve body.

Another object of the present invention resides in the provision of a mixing faucet valve body comprising a one piece elongated body member providing a coaxial through bore, inlet porting composed of a pair of diametrically opposed cross passages intersecting the through bore inwardly from one end and opening through the valve body exterior wall and respective axially directed passages intersecting the cross passages between the ends of the cross passages and opening through the one end of the valve body, and spout outlet passage means including at least one cross passage intersecting the through bore adjacent the other end of the valve body; respective seal assemblies disposed in the valve body cross passages including sleeve-like seals spring biased toward the valve body through bore and having their leading ends contoured to form continuations of the wall defining the through bore and their opposite ends annularly beaded to sealingly cooperate with the wall defining the inner ends of the valve body cross passages, biasing compression springs disposed in end butting relation to the opposite ends of the sleeve-like seals, and respective abutment plugs threaded into the outer end of the valve body cross passages into engagement with the outer ends of the compression springs to maintain the springs under compression.

Another object of the present invention resides in the provision of a mixing faucet valve body adapted for use in a multi outlet bath tub unit comprising a one piece elongated body member providing a coaxial through bore, inlet porting composed of a pair of diametrically opposed hot and cold water cross passages intersecting the through bore inwardly from one end and opening through the valve body exterior wall and respective axially directed passages intersecting the cross passages between the ends of the cross passages and opening through the one end of the peripheral valve body and spout outlet passage means including an annular groove in the peripheral wall of the valve body located between the intersection of the diametrically opposed cross passages with the through bore and the other end of the valve a cross passage intersecting the annular groove and the axially directed blind bore, an axially directed blind bore radially outwardly offset from the coaxial through bore and angularly spaced from the opposed cross passages of the inlet porting opening through the one end of the valve body and intersecting a second annular groove provided in the body wall intermediate said first annular groove and said cross passages.

Still another object of the present inveniton resides in the provision of a mixing faucet spindle valve member comprising a one piece elongated body providing a blind coaxial bore opening through one end of the body and an outlet cross passage intersecting the blind bore adjacent its inner end and formed at its other end to non-rotably mount a valve operator; and plug means threaded into the open end of the blind bore thereby adapting the blind bore to serve as a mixing chamber.

A further object of the present invention resides in the provision of a mixing faucet valve body adapted for use in a multi outlet kitchen unit comprising a one piece elongated body member providing a coaxial through bore, inlet porting composed of a pair of diametrically opposed hot and cold water cross passages intersecting the through bore inwardly from one end and opening through the valve body exterior wall and respective axially directed passages intersecting the cross passages between the ends of the cross passages and opening through the one end of the valve body and spout outlet passage means including at least one cross passage intersecting the through bore adjacent the other end of the valve body and an axially directed passage angularly related to said inlet passages, and opening through the one end of the valve body to provide a spray head supply passage.

A further object of the present invention is to provide a single lever mixing faucet for use as a kitchen deck unit comprising a one piece elongated valve body defining a coaxial through bore, inlet porting comprising diametrically opposed hot and cold water cross passages intersecting the through bore inwardly from one end and opening through the valve body exterior wall and respective axially directed supply passages intersecting the cross passages and opening through the one end of the valve body, outlet passage means including a pair of axially spaced annular grooves in the body exterior wall adjacent the other end of the valve body and cross passage means axially spaced from said inlet porting toward the other end of said valve body interconnecting the through bore and the outermost annular groove and an axially directed discharge passage angularly spaced from the opposed inlet porting and intersecting the inner annular groove and opening through the one end of the valve body; a spout assembly including a sleeve-like hub telescoped over the valve body in spanning relation to the exterior body annular grooves, a spout passage intersecting the sleeve-like hub opposite the inner annular groove and defining a diverter valve chamber at its inner end intersected between its ends by a branch passage leading to the outermost annular groove; ring seal means mounted in respective ring grooves formed in the exterior valve body wall between said annular grooves and adjacent the opposite ends of said annular grooves cooperating with the sleeve-like spout hub to prevent leakage between the annular grooves and from the hub ends; a diverter valve operatively disposed in the diverter valve chamber adapted to normally discharge the contents of the outer annular groove through the spout passage and selectively discharge the contents of the outer annular groove into and through the inner annular groove into the axially directed discharge passage intersecting the inner annular groove; and a spindle valve member rotatably and slidably mounted in the valve body through bore having a blind coaxial bore opening through one end and plugged to define a mixing chamber, passage means including a cross passage intersecting the mixing chamber inwardly of its blind end having constant communication with said valve body cross passage means, and a pair of angularly directed cross passages adjacently related to its one end and intersecting the mixing chamber along respective axes defining an included angle less than 180°, said angularly directed passages in the normal off position of the spindle valve member being axially spaced out of registry with the diametrically opposed valve body cross passages; actuating means journalled on the other end of the valve body and fixedly connected to the adjacently related other end of the spindle valve member and adapted upon operation to selectively shift the spindle valve member axially into partial and full volume registry position opposite the diametrically opposed valve body cross passages and, upon rotation of the actuating means, to vary the mix of hot and cold water; and spring biased seal means disposed in diametrically opposed valve body cross passages including cylindrical seal means end contoured to sealingly abut the peripheral wall of the spindle valve member at the one end and provide leak proof conduits for delivery of water into the spindle valve cross passages.

BRIEF DESCRIPTION OF THE DRAWINGS

Further objects will appear from the following description and appended claims when read in conjunction with the accompanying drawings wherein:

FIG. 1 is a top plan view of the mixing faucet of the present invention incorporated in a kitchen deck unit and showing the faucet in its normal "off" position;

FIG. 2 is a longitudinal sectional view taken on line 2—2 of FIG. 1 looking in the direction of the arrows;

FIG. 3 is a longitudinal sectional view taken on line 3—3 of FIG. 1 looking in the direction of the arrows;

FIG. 4 is a top end view of the assembled valve body and spindle valve of FIG. 2 illustrating the angular relationship of the spindle valve inlet passages and the valve body inlet passages in the normal "off" position of the faucet;

FIG. 5 is a longitudinal sectional view on an enlarged scale through one of the spring biased seal assemblies employed in the valve body inlet passages;

FIG. 6 is a plan view of a sealing gasket employed between the main valve body and the adaptor plate provided for fixedly mounting the valve body to the sink unit;

FIG. 9 is a top plan view of the mixing faucet of this invention modified to serve as a bath tub unit with the operating handle and trim covering removed to better illustrate the body construction and adapter assembly provided for such a unit;

FIG. 10 is a vertical section view taken along line 10—10 of FIG. 9 looking in the direction of the arrows with the trim covering in place and an operating knob;

FIG. 11 is a sectional view taken substantially on line 11—11 of FIG. 10 looking in the direction of the arrows;

FIG. 12 is a vertical sectional view of the mixing faucet of this invention modified to serve as a lavatory deck unit; and FIG. 13 is a section view taken substantially on line 13—13 of FIG. 12 to illustrate the internal body details and the manner of mounting and connecting the lavatory deck unit to the lavatory deck plate and supply pipes.

DESCRIPTION OF THE PREFERRED EMBODIMENT

Figure 8:
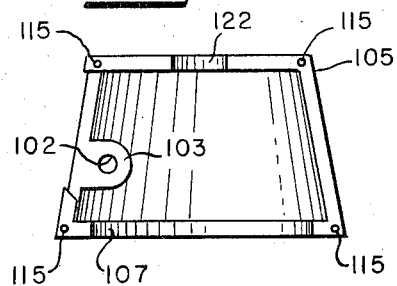
FIG. 8 is an elevational view of the lowermost mounting cup half of FIG. 7 as viewed from the vertical axis of the faucet.

With continued reference to the drawings wherein like reference numerals are employed throughout the several views to indicate the same parts, the numeral 10 generally designates the kitchen sink faucet assembly of the present invention. Assembly 10 is made up of a combination valve body support and mounting plate assembly 11 and a control valve and spigot assembly 12 adapted for installation on a conventional sink unit 20 provided with the conventional hot and cold water spigot openings as shown in FIG. 2.

As will be clear from a consideration of FIGS. 2 and 3, valve body support and mounting plate assembly 11 is made up of a generally elongated rectangular clamp plate 13 having an upwardly offset cylindrical center portion 14 through apertured at 15 to freely pass the depending cylindrical body 16 of an adapter assembly 17 providing inlet supply pipe connections 18 and 19 (FIGS. 2 and 3) and a spray head outlet supply pipe 21 (FIG. 3). As best seen in FIG. 2 clamp plate 13 is provided with a peripheral depending skirt 22 the end face 23 of which defines a planar surface for abuttingly engaging the opposing planar upper surface of the conventional sink unit 20.

Inwardly from its opposite ends, clamp plate 13 is provided with respective bolt passages 24 freely passing the threaded shanks 25 of headed clamp bolt, nut and washer assemblies 26. Bolt passages 24 are laterally spaced along the longitudinal center line of clamp plate 13 a distance equal to the spacing of the conventional sink unit spigot openings. Bolt shanks 25 are intended to be projected downwardly through the spigot openings to receive clamp washers 27 which, when nuts 28 are threaded home, will be forced upwardly along shanks 25 into surface contact with the under surface of the top plate of the sink unit to clampingly secure clamp plate 13 to the sink unit with the depending body 16 of adapter assembly 17 centered in opening 15.

While on site installation of valve body support and mounting plate assembly 11 may be effected, if desired, it is preferable to market faucet assembly 10 as a factory assembled unit. To this end, body 16 of adapter assembly 17 includes an outwardly extending peripheral flange 29 dimensioned to overlie the upper face of the upwardly offset cylindrical center portion 14 of clamp plate 13. Flange 29 and cylindrical center portion 14 are provided symmetrically around the axis of body 16 with aligned screw passages (not shown) dimensioned to freely pass the shanks of securing screws 31 (two of the preferable four screws being shown in FIG. 2). Screws 13 are threaded home in aligned tapped blind bores (not shown) provided in the marginal lower end face areas of main valve body 32 of control valve and spigot assembly 12 to clamp flange 29 between center portion 14 of plate 13 and the lower end face of valve body 32. As a consequence of this screw connection, valve body 32 is fixedly secured in upstanding relation to clamp plate 13.

As will more clearly appear from FIG. 2, body 16 of adapter assembly 17 is provided with a pair of diametrically spaced through passages 33 and 34 (FIG. 2) and a third through passage 35 (FIG. 3) extending upwardly from respective end opening cylindrical recesses 36 into which the ends of inlet supply pipes 18 and 19 and outlet supply pipe 21 are respectively inserted and brazed to effect leak proof connections to the adapter plate assembly 17. Passages 33, 34 and 35 are respectively in communication at their upper ends with the lower enlarged ends 37 of axially directed, angularly spaced inlet passages 38 and 39 and axially directed, angular spaced outlet passage 41 (FIG. 3) provided in valve body 32 in radial outward relation to main through bore 42 of valve body 32. To prevent fluid leakage along the parting faces between adapter plate assembly 17 and valve body 32, a suitable sealing gasket 43, (FIG. 6) having mating through passages 31a, 33a, 34a, 41a and 42a to pass screws 31, to permit free fluid flow from passages 33, 34 and 35 to passages 38, 39, and 41, and to vent the lower end of bore 42 to atmosphere through slot 42b is interposed between these parting faces.

Referring for the moment to FIG. 2, it will be clear that passages 38 and 39 are blind bores located on opposite sides of centered, axial through main bore 42 of valve body 32, while passage 41 is located outwardly of main bore 42 toward the rear side of valve body 32, as viewed in FIG. 1. In a typical faucet assembly 10 valve body 32 has an overall length of approximately 3¼ inches, a diameter at its lower end of approximately 2 inches, the center-to-center spacing of passages 38 and 39 is approximately 1⅛ inches, and the diameter of through bore 42 is approximately ⅝ of an inch. The length of blind bores 38 and 39 is approximately 1 1/16 inches and the peripheral wall of valve body 32 beyond the blind ends of blind bores 38 and 39 is provided with respective annular recesses 44 and 45 respectively intersected by passage 41 (FIG. 3) and cross passages 46 (FIG. 2) the inner ends of which intersect main bore 42 at an angle to dispose its inner end inwardly of a plane defined by the annulus 47 separating annular recesses 44 and 45. The peripheral wall of valve body 32 intersecting axially spaced annular recesses 44 and 45 defines a cylinder of uniform diameter from end-to-end dimensioned to freely but closely interfit the sleeve-like hub of a spout assembly to be presently described in detail.

As best seen in FIG. 2, the lower portion of main valve body 32 inwardly of the blind ends of inlet passages 38 and 39 is provided with diametrically opposed stepped cross passages 50 the innermost ends of which intersect main bore 42 and thereby provide a passage between bore 42 and blind passages 38 and 39. The outer ends 51 of cross passages 50 radially outwardly of passages 38 and 39 are of greater diameter than the inner ends and provide respective threaded counter bores 52 which open through the peripheral wall of main body 32 for a purpose that will presently appear. The diameter of main valve body 32 in the region of counter bores 52 is increased slightly to a diameter of approximately 2⅛ inches. This increased diameter defines an axially upwardly facing shoulder 53 and a corresponding downwardly facing shoulder 57 which abuts against a cover member 56 and delimits the smaller diameter portion of valve body 32 which mates with gasket 43.

In assembling valve body 32 with mounting plate assembly 11 and adapter plate assembly 17, an annular brass trim ring 54 having an inturned flange 55 abutting shoulder 53 and an opposite end abutting an inverted shell-like brass cover member 56 of elongated generally rectangular configuration having a central cylindrical opening closely enclosing the smaller diameter portion of valve body 32 and a depending diverging peripheral skirt 58 successively telescoped over the smaller diameter end of valve body 32 before mounting plate assembly 11 and adapter plate assembly 17 and gasket 43 are secured in place by screws 31. The exposed surfaces of ring 54 and cover member 56 are preprefereably chrome plated to provide bright polished housings for the lower end of valve body 32 and mounting plate assembly 11. To assure effective housing of these parts and at the same time permit selective rotation of ring 54 relative to valve body 32 and cover member 56, the side wall of ring 54 and skirt 58 of cover member 56 are axially dimensionally correlated relative to clamp plate 13 to span the distance between shoulder 53 and the upper surface of the sink unit when clamp bolt and nut and washer assemblies 26 are threaded home.

While the assembly of valve body 32, ring 54, cover member 56, adapter plate assembly 17 and mounting assembly 11 is preferably effected at the factory, it will be appreciated that on-the-site adjustment to accommodate minor variations in sink top wall thicknesses can be readily effected by grinding or filing the sink top abutment edges of mounting plate 13 or cover member 56 or both if necessary.

Valve body 32 adjacent its upper end is provided with an annular groove 61 radially intersected by a pin receiving drill bore 62 the axis of which lies in a longitudinal plane defined by the diametrically opposed axes of cross passages 50. Drill bore 62 mounts in press fitted relation a stop pin 63 the outer end of which projects into groove 61 for a purpose to be presently pointed out.

Valve body 32 telescopes into a cylindrical sleeve-like hub 64 of a discharge spout assembly 65 having a main axially inclined discharge spout 66. Spout 66 provides an axial through bore 67 of generally rectangular configuration in cross section terminating at its inner end in a reduced diameter, coaxial cylindrical branch passage 68 opening into the through bore 69 of hub 64 opposite annular recess 44 of valve body 32. Passage 68 is dimensioned to receive a diverter valve 71 of any conventional construction, for example, the housed unit type disclosed in United States Letters Patent No. 3,587,961 to R. E. Bletcher et al or No. 3,232,307 to E. H. Bucknell et al, modified to provide side entry passages 72. Passage 68 radially outward of its intersection with hub bore 69 is of cylindrical cross section to accept diverter valve 71 the opposite ends of which are annularly grooved to receive o-ring seals 74 spaced to seal with the wall of passage 68 at opposite sides of an intersecting arcuate passage 73 intersecting through bore 69 of hub 64 opposite annular recess 45.

As will be clear from FIGS. 2 and 3, hub 64 is of an axial length to enclose valve body 32 between annular groove 61 and inturned lip 55 of trim ring 54 and includes an arcuate bridge member 75 separating spout assembly branch passages 68 and 73 directly opposite the annulus 47 separating annular recesses 44 and 45. Bridge 75 and the opposite ends of hub bore 69 are engaged by seal rings 48 seated in ring grooves formed in the opposing peripheral wall of valve body 32 between and adjacent the opposite axial ends of annular recesses 44 and 45. It will be appreciated from the foregoing description of hub 64 that sealing contact between valve body seal rings 48 and the opposing wall portions of hub bore 69 is maintained at all times and that swivelling of spout assembly 65 around valve body 32 is frictionally resisted solely by seal rings 48. As a consequence, the chances of inadvertent angular shifting of spout 66 as well as leakage from the ends of hub 64 and between annular recess 44 and 45 is prevented by seal rings 48.

To control volume flow and proportion cold and hot water flow between the inlet passages 38 and 39 and spout 66, the present invention provides a simple spindle valve assembly 76. Assembly 76 comprises an elongated spindle valve member 77 and an actuator lever and handle unit 78. Valve member 77 includes a major diameter body portion 79 at one end dimensioned to have a close fit with through bore 42 of valve body 32, a reduced diameter body portion 81 immediately adjacent body portion 79, a further short major diameter body portion 82 immediately adjacent body portion 81 dimensioned to closely fit bore 42, and an elongated reduced diameter portion 83 at its other end. In the typical faucet assembly previously mentioned, the overall length of spindle valve member 77 is approximately 3½ inches, body portion 79 is approximately 1⅛ inches in length, body portion 81 is approximately one inch in length, body portion 82 is approximately 5/16 inches in length, and body portion 83 is approximately 1 1/16 inches in length. Spindle valve member 77 is provided with a coaxial blind bore 84 opening through the end face of body portion 79 and terminating at its inner end just short of the major diameter body portion 82. At its inner end, blind bore 84 is intersected by a radially directed cross passage 85 opening through the peripheral wall of reduced diameter body portion 81 to place bore 84 in continuous communication with the annular chamber 86 defined by bore 42 and reduced diameter body portion 81 and delimited at its ends by the oppositely axially facing shoulders of major diameter body portions 79 and 82. The open end of blind bore 84 is threaded to receive a closure plug 87 and inwardly of plug 87 is provided with a pair of cross passages 88 and 89 the axes of which intersect the longitudinal axis of blind bore 84 to define an included angle of 128° at a point along said axis spaced approximately ⅜ inches inwardly from the end face of body portion 79. The opposite end of spindle valve member 77 is diametrically through slotted at 91 along a diameter bisecting the included angle of 128° to establish the proper correlation between cross passages 88 and 89 and the cooperating diametrically opposed valve body cross passages 50 to effect the desired operation to be hereinafter pointed out. Spindle valve member 77 is provided with respective ring grooves adjacent the outer end of body portion 79 and midway of body portion 82 fitted with ring seals 90 to prevent leakage between chamber 86 and bore 42 in all axial operating positions of spindle valve member 77.

The actuating lever and handle unit 78 is mounted in slot 91 by means of a pivot pin 92 press fitted in opposing drilled passages 93 (FIG. 2) formed at right angles to slot 91 in the axially extending mounting arms 94 and passing through an angular slotted through passage in arm 95 projecting laterally outwardly from the integral main body portion of a lever 96 (FIG. 3) formed of plastic. While lever 96 may be formed of any suitable material such as Nylon or ABS plastic, a glass-filled Nylon composition is preferred because of the additional strength imparted by the glass filling. As best seen in FIG. 2, arm 95 and body portion of lever 96 are of a uniform thickness and arm 95 is freely received between the slot defining side walls of mounting arms 94. The planar lower edge 97 of arm 95 and lever 96 is spaced above the slot end wall 98. This spacing assures adequate clearance to permit arm 95 to swing around pivot 92 as spindle valve member 77 slides axially outwardly from its normal full closed position of FIGS. 2 and 3 to its full open position shown in dot-dash lines in FIG. 3.

Figure 7:
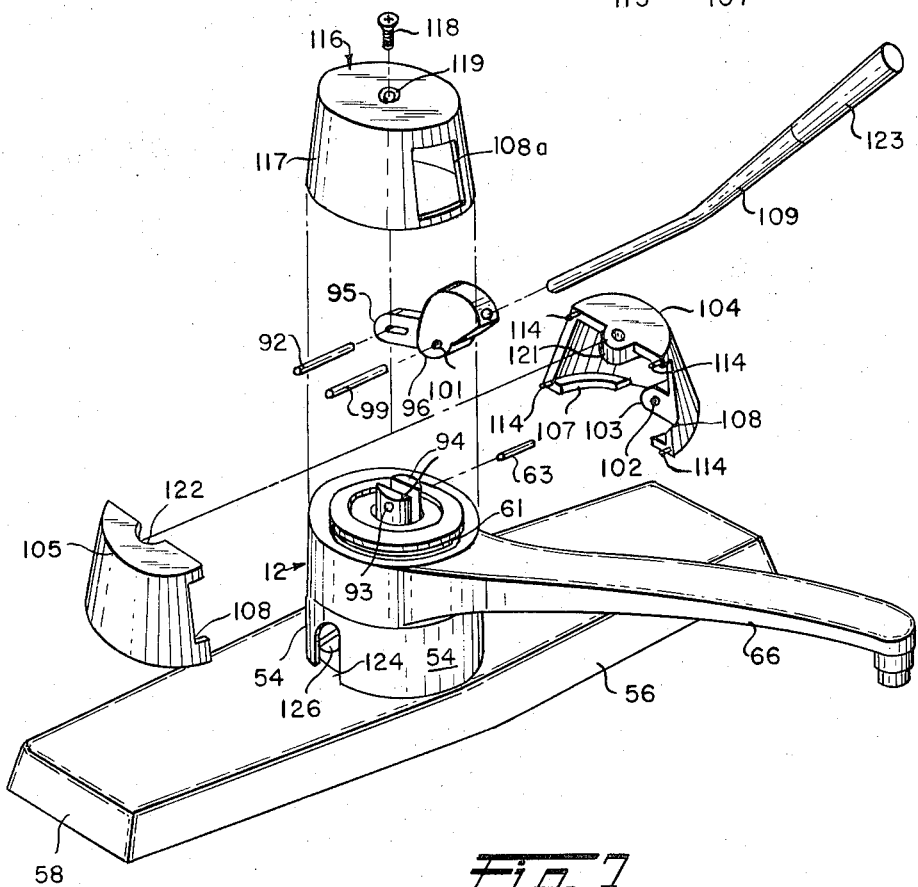
FIG. 7 is a perspective view of the kitchen sink deck unit of FIG. 1 with the operating mechanism and its mounting structure depicted in exploded fashion to better illustrate the construction and operative cooperation of the operating mechanism.

This axial movement of spindle valve member 77 determines the flow volume through faucet 10 and is effected by rotation of lever 96 around the axis of pivot pin 99 press fitted in a transverse through passage 101 in the body portion of lever 96 with its opposite ends journalled in blind bores 102 (FIGS. 7 and 8) in opposing inwardly directed ears 103 integrally formed on the downwardly diverging side walls of respective inverted cup halves 104 and 105 (FIGS. 3 and 7). Ears 103 are located adjacent respective mating side wall notches 108 opening through the opposing parting edges of skirts 106 at one diametrical extremity of the cup halves. Cup halves 104 and 105 may also be formed of Nylon, ABS (acrylonitrile - butadiene - styrene) plastic, or the glass filled Nylon composition previously mentioned and, as will be clear from a consideration of FIGS. 2 and 3, skirts 106 terminate opposite valve body annular groove 61 in inturned arcuate flanges 107 axially dimensioned to slidingly interfit in annular groove 61.

Flange 107 of cup half 105 extends continuously through the 180° arc defined by the parting edges of its skirt 106, whereas the flange 107 of cup half 104 extends only through an arc of about 63° from each respective parting edge of the skirt 106 of cup half 104 as will more clearly appear from FIG. 7. This provides a discontinuity in the flange 107 of cup half 104, the discontinuity being the arcuate space between the inner flange ends each of which are spaced about 27° from a plane containing the axis of skirt 106 of cup half 104 and normal to the plane of the parting edges of skirt 106. The discontinuity in flange 107 of cup half 104 accommodates the stop pin 63 fixed in body groove 61. Stop pin 63 extends radially outward of valve body 32 a sufficient distance to engage the inner ends of flanges 107 of cup half 104 but not so far as to contact the inner surface of its skirt 106. The pin 63, therefore, serves as a stop member cooperating with the inner ends of flanges 107 of cup half 104 to limit rotation of actuating lever assembly 78 relative to valve body 32 in either direction from its normal full off position of FIG. 1 an angular distance of about 27° which determines the full "hot" and full "cold" delivery positions of faucet 10.

Actuation of assembly 78 and rotation of the mounting provided by cup halves 104 and 105 is effected manually through an operating handle 109. Handle 109 as best seen in FIG. 3 is fixed at one end in the upper arcuate edge 111 of the body portion of lever 96 and projects upwardly and outwardly therefrom in angularly spaced relation above spout 66. Arcuate edge 111 is circumscribed around the axis of passage 101 on a radius of a length to clear the upper delimiting ends of notches 108 and projects outwardly through the mating notches 108 to permit the handle end to be fixed adjacent the projecting end of edge 111. Edge 111 is delimited radially outward of pivot pin 99 by an upwardly and outwardly inclined edge wall 112 provided to assure that the body portion of lever 96 will clear the end of valve body 32 upon clockwise pivotal movement of actuating lever and handle unit 78. The opposite end of operating handle 109 terminates in a reduced diameter threaded shank 113 for a purpose to be presently pointed out.

To assure proper mating alignment of cup halves 104 and 105 in assembled relation and prevent binding of inturned flanges 107 in annular groove 61, the opposing parting edges of the side walls 106 of cup halves 104 and 105 at their opposite ends are respectively provided with aligning pins 114 (FIGS. 2, 3 and 7) and aligning pin recesses (FIG. 8). Assembly is effected by moving the cup halves laterally toward each other to engage the opposite ends of pivot pin 99 in journal recesses 102 and flanges 107 in groove 61 and then shifted relative to each other as necessary to align and mesh pins 114 in their opposed recesses 115 to guide the cup halves into edge butting assembled relation. This assembled relationship is maintained by an inverted cap 116, preferably chrome finished to match spout 66, ring 54 and plate 56, and having a continuous diverging annular skirt 117 providing a side wall opening 108a (FIGS. 3 and 7) dimensioned to freely pass the projecting portion of the main body portion of lever 96. Cap 116 is assembled into close mating enclosing relation to cup halves 104 and 105 by passing handle 109 outwardly through side wall opening 108a and bodily shifting cap 116 inwardly along handle 109 into position above the assembled cup halves and lowering it into position to enclose the cup halves. Cap 116 is then secured to cup halve 104 by a headed screw 118 the shank of which freely passes through a countersunk opening 119 centered in the cap end wall into threaded engagement in a tapped blind bore in a depending cylindrical boss 121 (FIG. 3) integrally formed on the end wall of cup halve 104 in coaxial relation to the longitudinal axis of spindle valve member 77. To accommodate this boss 121, the end wall of cup halve 105 is provided with a semi-cylindrical notch 122 (FIG. 7) dimensioned to abuttingly engage the semicylindrical side wall of boss 121. The actuating lever and handle assembly 78 is then completed by threading an outwardly diverging hand knob 123 on to the threaded shank 113 of handle 109. Preferably the major dimension of knob 123 at its outer end exceeds the cross dimension of side wall opening 108a of cap 116 to prevent removal of cap 116 outwardly along handle 109 unless knob 123 is first removed.

The faucet assembly 10 is then completed by rotating ring 54 to successively align an access notch 124 opening through its lower edge respectively with the outer ends of valve body cross passages 50 so spring biased seal assemblies 125 can be fitted into the respective passages 50 and rendered operative by threading closure plugs 126 into the tapped outer ends 51 of passages 50. These seal assemblies are provided to prevent leakage between the valve body inlet passages 50 and spindle body portion 79, particularly when the spindle valve member 77 is in its full closed position, and the notched rotatable ring 54 provides ready access to these seal assemblies without any need to disassemble the main valve elements. To accomplish these highly desirable ends, particularly positive sealing and ready removal of the seals for servicing, the seal assemblies 125 themselves are of a unique construction as will now be pointed out.

Referring for the moment particularly to FIGS. 2 and 5, each assembly 125 comprises a resilient seal element 135 formed of Buna-N rubber and composed of a cylindrical body portion 127 one end of which is provided with an integral annular beading 128 of arcuate configuration in cross section. Seal element 135 inwardly from the one end and internally at spaced intervals along an axially extending helical path is provided with radially inwardly directed knobs 129 adapted to threadedly enter between the inner end coils of its associated biasing spring 131. As best seen in FIG. 5, body portion 127 slightly beyond the innermost knob 129 is reduced in diameter to form an axially facing annular shoulder 132 disposed to abuttingly engage the inner end coil of spring 131 when spring 131 is threaded home along knobs 129. This threaded engagement joins each seal element 135 and its associated biasing spring 131 for unitary insertion and withdrawal endwise through tapped passage ends 51 into passage 50 with annular beading 128 sealingly engaging the reduced diameter portions of the respective passages 50 inwardly of their intersection with inlet passages 38 and 39. The other ends of seal element body portions 127, the ends opposing body portion 79 of spindle valve member 77, are concavely configured to conform to the peripheral surface of spindle body portion 79. As a consequence, the concave ends sealingly cooperate with the peripheral surface of spindle body portion 79 to delimit a fluid discharge passage into valve body bore 42 having a diameter equal to the reduced diameter of seal body portion 127. Preferably the diameter of this fluid discharge passage is equal to the cross passages 88 and 89 of spindle valve member 77. It follows, therefore, that the line pressure existing in valve body inlet passages 38 and 39 and the outer ends 51 of the valve body cross passages 50 acts at all times against annular beading 128 and shoulder 132 to augment the biasing force of springs 131 and pressure load the seals assuring a leak proof abutting engagement of the concave ends of seal elements 135 and the peripheral surface of spindle valve body portion 79. The outer threaded ends 51 of cross passages 50 threadedly receive the externally threaded shanks 134 of seal plugs 126, the outer ends 136 of which are of increased diameter to overlap the annular axially outwardly facing shoulder 137 of counter bores 52 of valve body 32 and have a close fit with the annular walls of the respective counter bores 52. The inner end faces of shanks 134 of seal plugs 125 are annularly recessed at 138 to form inset bearing sets for abuttingly engaging the outer ends of biasing springs 131 and sealing washers 139 are mounted on shanks 134 in abutting contact with the overlapping increased diameter ends of seal plugs 126. Upon threading seal plugs 126 home in the threaded ends 51 of valve body cross passages 51, the biasing springs 131 will be compressed axially to impart a predetermined biasing force to springs 131 while clamping sealing washers 139 tightly between shoulder 137 and the opposing annular axially facing surface of the increased diameter outer ends 136 of seal plugs 126. As a consequence, the outer ends of valve body cross passages are sealed against fluid leakage past seal plugs 126 thus assuring that the full line pressure in inlet passages 38 and 39 as well as the designed biasing force of springs 131 is applied to seal elements 135.

When seal assemblies 125 and seal plugs 126 are fully assembled as heretofore pointed out, ring 54 is rotated to position its access notch 124 to the rear of the installed faucet assembly 10 out of view. It follows, therefore, that the installed faucet assembly 10 presents to view a completely chrome plated installation that is both pleasing in appearance and susceptible to ready servicing with minimal disassembly of the faucet for the most likely servicing problems, namely, replacement of seal elements 135 which are subject to the greatest wear and servicing of the rotatable mounting formed by the cup halves 104 and 105.

While the operation of the faucet is believed to be obvious from the preceeding description, it may be pointed out that swinging of spout 66 from side-to-side as desired may be accomplished with minimum effort since it is only necessary to overcome the drag forces imposed on the inner wall of spout hub 64 by the three seal rings 48. Likewise, volume control of the water flowing through the faucet is effected by depressing and raising handle 109 to pivot actuating lever assembly 78 in journals 102 with resulting axial shifting of spindle valve member 77 within valve body bore 42. Since the only resistance to such axial shifting movement of spindle valve member 77 is the drag force offered by seal rings 90 sliding along valve body bore 42 and as the actuating lever assembly 78 provides a leverage advantage to overcome this drag force, minimum effort is required to effect volume flow control. In this connection, it will be recalled that the lower end of valve body bore 42 is vented to the atmosphere through slot 42b of gasket 43 while the upper end of spindle valve member 77 is likewise vented to the atmosphere through notches 108 and cap opening 108a. Furthermore, it will also be recalled that the water pressure in all flow positions of spindle valve member 77 acts equally and oppositely on opposing surfaces of equal area between body portions 79 and 82 of spindle valve member 77. This pressure balancing arrangement thereby serves to prevent the spindle valve member 77 from shifting from a selected volume flow position under influence of the existing water pressure.

It will also be apparent that proportioning of hot and cold water by rotation of the mounting carrying the actuating lever and handle unit 78 from the centered equal proportioning position in either direction involves relative friction free operation due to the low friction characteristics of the plastic cup halves 104, 105 and cooperating brass parts of body 32 and the minimal rotational drag forces offered by rings 90. Furthermore, a leverage advantage is involved in this operation also since cup halves 104, 105 rotate in valve body groove 61 spaced radially outward of the spindle valve axis and the knob 123 normally grasped by the operator is a substantially greater radial distance outwardly.

This embodiment of the present invention provides a single lever mixing faucet of extreme simplicity for application to kitchen sinks that provides minimal operating and servicing problems, easy operation and long trouble free life due to the reduction of seal wear points.

ALTERNATE EMBODIMENTS

Referring for the moment to FIGS. 9 and 10, there is illustrated a modified faucet of the present invention providing a bath tub unit. In this form of the invention, the valve body 32a at the lower end is formed to provide a cylindrical mounting flange 140 having a cylindrical parting surface adapting body 32a for mounting on an opposing cylindrical parting surface of an adapter 17a taking the place of adapter assembly 17 of the previous embodiment. Assembly 17a provides oppositely opening hot and cold water inlet porting 33a, 34a threaded at their outer ends to receive hot and cold water supply pipes 18a and 19a conventionally provided in the house wall at one end of the tub and at right angles thereto provides opposed outlets 141 and 142 to be presently described in detail. The main valve body is integrally formed with flange 140 and comprises a body of generally axially directed, cloverleaf configuration in cross section providing an axially directed center portion 143 (FIG. 10) having a through bore 42 and diametrically opposed axially directed lobes 144 terminating at their ends remote from flange 141 in diametrically opposed stepped cross passages 50a intersecting bore 42 and opening through the outer body wall. These cross passages correspond to cross passages 50 of the previous embodiment. The diametrically opposed axially directed lobes 144 define respective axial bores 37a opening through the parting face of flange 140 and corresponding to bores 37 of the previous embodiment. The opposite ends of passages 37a terminate short of cross passages 50a and are provided with respective radially outwardly offset passages 38a, 39a communicating the opposite ends of bores 37a with cross passages 50a adjacent their outer ends. The outer ends of cross passages 50a open through the outer walls of lobes 144 and are threaded adapting them to receive spring bised seal assemblies 125 identical to those of the previous embodiment. These seal assemblies are arranged to sealingly cooperate with a spindle valve member 77a rotatably and slidingly disposed in valve body through bore 42 and corresponding to spindle valve member 77 of the previous embodiment.

As best seen in FIG. 10, the inlet porting 33a, 34a of adapter 17a includes respective right angular passages opening through the cylindrical parting face of adapter 17a at diametrically opposed points radially outwardly offset from a laterally centered chamber 145 in position to respectively align with the axial bores 37a of valve body 32a. Chamber 145 communicates at its opposite ends with opposed outlets 141 and 142 and is provided with a rearwardly and upwardly curving partition wall 146 as viewed in FIG. 10 leading to a radially offset passage 147 opening through the cylindrical parting face of adapter 17a at a point 90° offset from the inlet porting 33a and 34a in coaxial relation to the third lobe 148 of valve body 32a. Outlet ports 141 and 142 are internally threaded at their outer ends adapting them respectively to be connected to the tub outlet spout (not shown) and the shower head supply pipe (not shown) conventionally provided in a tub installation.

The offset passage 147 is in fluid communication with the axially directed leg of a right angular passage 149 formed in body lobe 148 the other leg 150 of which intersects the body through bore 42 axially inwardly of cross passages 50a. As a consequence, the right angular passage serves as a supply passage leading through chamber 145 to outlets 141 and 142 of adapter 17a. The valve body through bore 42 at its end opening through the cylindrical parting surface of flange 140 is vented to the atmosphere through a radially directed groove 151 formed in the cylindrical parting surface of adapter 17a, an intersecting inclined passage 152 formed in a peripherally disposed boss 153 of valve body 32a, and a vent tube 154 fixedly mounted in the outer end of passage 152. A suitably apertured gasket 43a slotted at 155 opposite groove 151 and apertured at 156 opposite passages 37a, axially directed leg of passage 149 and at four 45° angular points opposite lobes 144 of valve body mounting flange 140 to pass mounting screws 157 (FIG. 9) is provided to seal the parting surfaces of adapter 17a and flange 140.

Referring for the moment to FIG. 10, spindle valve member 77a is provided with an axially directed blind bore 84 opening through the end face of a major diameter body portion 158 provided at its inner end and dimensioned to have a clearance fit with valve body through bore 42. Body portion 158 is provided with an annular ring groove mounting a quad ring 48 sealingly slidingly cooperating with the wall of valve body through bore 42 and the open end of blind bore 84 is threaded to receive a closure plug 87. Immediately inward of major diameter body portion 158, spindle valve member 77a is reduced in diameter to provide a reduced diameter body portion 159 extending toward its opposite protruding end to a second major diameter portion 79 and defining an annular chamber 86 corresponding to chamber 86 of the previous embodiment. This second major diameter portion, in the "full off" valve position illustrated in FIG. 10, extends from a plane defined by the inner ends of valve body bores 37a beyond the inner end of blind bore 84 to a point beyond valve body cross passages 50a where it is provided with an annular ring groove mounting a second quad ring 48 sealingly slidingly cooperating with valve body through bore 42. A second reduced diameter body portion 83a is provided at the opposite end of spindle valve member 77a and protrudes beyond the cylindrical end of valve body center portion 143 which is peripherally cross slotted at diametrically opposed points 161 to fixedly receive a C-shaped ring segment 162 the purpose of which will be presently pointed out.

Major diameter portion 79 of spindle valve member 77a adjacent its juncture with reduced diameter body portion 159 is provided with a pair of cross passages 88 and 89 the axes of which intersect the axis of blind bore 84 to define an included angle of 128° at a point spaced approximately ⅝ inches inwardly from the juncture of body portion 79 and reduced diameter body portion 159. As in the previously described embodiment of this invention, proper correlation between cross passages 88, 89 and the cooperating diametrically opposed valve body cross passages 50 is obtained by angularly orienting spindle valve member for operation so that spindle valve member 77a in its normal "full off" position is positioned so the included angle defined by cross passages 88 and 89 is bisected by a plane at right angles to the common axis of cross passages 50 (See FIG. 9). The terminal end of reduced body portion 83a protrudes beyond the slotted end of valve body center portion 143 and is provided with a flat 163 at one side adapting the free end of reduced body portion 83a to non-rotatably receive an operating knob 164. Knob 164 is provided with a stepped bore opening through its under end face through a major diameter cylindrical step bore 165 dimensioned to rotatably interfit with the peripheral surface of ring segment 162 and an adjacently related reduced diameter step bore 166 formed at one side with a mating flat adapting step bore 166 for non-rotatable association with the terminal end of spindle valve reduced diameter body portion 83a. The step bore beyond reduced diameter step bore 165 is provided with a further reduced diameter bore 167 defining a flared entry end 168 opening through the opposite end face of knob 164 to freely pass a securing screw 169 threaded into a tapped coaxial blind bore in the protruding end of body portion 83a of spindle valve member 77a. It will be appreciated from the preceeding description that operating knob 164 is fixedly secured against relative axial and rotational movement to the protruding end of spindle valve member 77a and is rotatably and axially shiftably mounted on ring segment 162. As a consequence, one grasping knob 164 may rotate knob 164 and spindle valve member 77a as a unit and axially shift knob 164 and spindle valve member 77a as a unit to respectively control mixing of hot and cold water and the volume of water discharged through the faucet. Since spindle valve member 77a is supported solely by quad rings 48, free sliding and rotation of spindle valve member 77a is assurred.

Any suitable means may be provided to establish rotational and axial limits of movement of spindle valve member 77a. As an example, the present invention provides a limit screw 171 threaded into the skirt of knob 164 having a pin-like protuberance on the shank end of the screw adapted to enter into an arcuate recess 172 formed in the peripheral wall of ring segment 162. Since the spindle valve passages 88 and 89 are related to body passages 50 as shown in FIGS. 9 and 10 when the spindle valve member 77a is in its normal "full off" position, groove 172 is of a width to permit axial movement of spindle valve member 77a outwardly from the position illustrated in FIG. 10 to bring the passages 88 and 89 into axial registry with the through bores in seal elements 135. Furthermore, since the angular orientation of passages 88 and 89 illustrated in FIGS. 9 and 10 provides equal mixing of hot and cold water when the spindle valve member 77a is axially shifted to effect axial registry of passages 88 and 89 with the through bores of seal elements 135, the angular length of groove 172 must be sufficient to permit rotation of spindle valve member 26° in opposite directions from its illustrated position of FIGS. 9 and 10 to assure full hot and full cold water discharge. Due to the described relationship of passages 88 and 89 to valve body passages 50, it will be apparent that a constant flow volume will be provided at any axial positioning of spindle valve member 77a irrespective of the angular setting of the spindle valve member as is the case in the preferred embodiment.

Assuming the tub faucet of the present embodiment is installed within a suitable opening in the tub end wall 173 as illustrated, finish trimming of the faucet installation is effected, with knob 164 and ring segment 162 removed, by telescoping a chrome plated escutcheon plate 174 over the protruding end of the faucet and securing it in abutting engagement with wall 173 by means of securing bolts 175 threaded into tapped holes provided in the corner flanges 176 of adapter 17a. As will be apparent from FIG. 10, the machine of macine screws 175 are seated within an annular depression providing an inset flange 177 defining the center opening of escutcheon plate 174. A plastic cover ring 178, preferably of black acrylonitrile-butadienna-styrene having depressions 179 therein to receive the heads of machine screws 175 and dimensioned to have a close fit with the annular wall carrying flange 177, is provided to conceal the screw heads. A cup-like chrome plated cover 181 having an end wall opening 182 dimensioned to freely but closely encircle the protruding end of valve body portion 143 inwardly of groove 161 and a skirt dimensioned to have a light force fit with the bore of cover ring 178 is then fitted in place to conceal the valve body inwardly of groove 161. The skirt of cup-like cover 181 adjacent its end wall is radially through apertured at 183 on a radius lying in a transverse plane containing the common axis of body passages 50 to provide ready access to seal assemblies 125 as previously described. At the time of assembly, cover 181 is rotated in cover ring 178 to position aperture 183 facing downwardly out of view. As a consequence, when ring segment 162 is assembled on the protruding end of valve portion 143 and knob 164 is secured in place a completely trimmed single control knob mixing faucet is provided.

Referring now to FIGS. 12 and 13, the present invention is incorporated in a centerset fixture adapted for use on a lavatory. In this form of the invention, valve body 32b comprises a generally cylindrical body 143a having a diameter comparable to body portion 143 of the tub unit of FIGS. 9 through 11, a through bore 42 and an outer end formed with an annular groove 161 fitted with a ring segment 162 and operating knob 164 identical to that of the tub unit of FIGS. 9 through 11. The same reference numerals will, therefore, be employed to indicate these elements and a detailed description thereof will be omitted.

Inwardly of its opposite end, body 143a is formed with diametrically outwardly directed, axially elongated bosses 185 and 186 (FIG. 13) provided with diametrically opposed stepped cross passages 50 corresponding to cross passages 50 of the previous embodiments and axially directed bores 37b and passages 38b and 39b corresponding to bores 37-37a and passages 38-38a and 39-39a of the previously described embodiments. As in the previous embodiments, passages 38b and 39b intersect cross passages 50 outwardly of the sleeve-like seal elements 135 of seal assemblies 125 identical to those previously described as mounted in cross passages 50 to sealingly cooperate with a spindle valve assembly 77b substantially identical to spindle valve member 77 of the preferred embodiment.

In lieu of an adapter assembly 17 or adapter 17a as provided in the previous embodiments of the invention, the supply pipes 18 and 19 (usually copper tubing directed to or through spigot openings in the deck plates of lavatories as well as kitchen sinks) are directly fitted into bores 37b to supply the hot and cold water to the respective cross passages 50. To accommodate this direct connection and at the same time adapt valve body 32b for mounting on the lavatory deck plate 187, the valve body 143a at its inner end is provided with axially, protruding, diametrically spaced, cylindrical mounting bosses 188. Bosses 188 are drilled and threaded to receive mounting screws 189 for securing valve body 32b to a forwardly inclined, centered, bridge portion 191 of a support plate 192 fixed to lavatory deck plate 187 by bolt, washer and nut assemblies 26a extending through the deck plate spigot passages 193 alongside of supply pipes 18 and 19. As will be apparent from an inspection of FIG. 13, the opposed side walls of bosses 188 overlap the open lower end of through bore 42 slightly to provide diametrically opposed arcuate abutments which limit the inward axial movement of spindle valve member 77b thereby predetermining its "full off" position. Since these arcuate abutments occupy only a small area of the inner end of through bore 42, the inner end of bore 42 is effectively vented to the atmosphere.

Spindle valve member 77b of this embodiment is substantially like valve member 77 of the preferred embodiment. A further detailed description would not seem necessary and, therefore, the same reference numerals have been employed in FIGS. 12 and 13. The only real difference is that the reduced diameter protruding end of the embodiment of FIGS. 1 to 8 has been replaced by the end structure and actuating knob structure of FIGS. 9 and 10. Since the earlier description respecting this end structure and actuating knob applies with equal force here, the same numerals have been employed in the drawings and a repetition of the description will be avoided at this point.

The lavatory unit of FIGS. 12 and 13 requires no second valve body outlet since neither a spray head nor a shower head need be supplied. As a consequence, the valve body 32b which, due to the angularity of the inclined bridge support section 191, extends upwardly and forwardly relative to the lavatory deck 187 to define therewith an included angle of about 60° is provided on its underside inwardly from its upper end with a single outlet passage 194. Passage 194 has an entry section leading from through bore 42 at right angles and is defined by an angular tubular projection 195 the outlet end of which defines a spout connection socket 196 to the axis of which extends forwardly at a slight upward inclination relative to lavatory deck 187 to receive the tubular section of a spout member 197 having an outlet end 198 opening downwardly therefrom at right angles. As best seen in FIG. 12, spout connection socket 196 is delimited at its inner end by an inwardly directed annular abutment flange 199 adapted to abuttingly engage the entrance end of the tubular section of spout member 197 which end is dimensioned to closely interfit in socket 196 and is annularly grooved to receive a seal ring 201 operative to effect a leak proof connection with spout member 197.

A chrome finished trim cover 202 is provided to house valve body 32b, mounting plate 192 and the upper and side surfaces of spout member 197. Cover member 202 comprises an elongated base section 203 of generally rectangular configuration having a peripherally depending skirt section 204 notched at 205 at its opposite ends to matingly receive the opposite ends of mounting plate 192, an upstanding forwardly inclined tubular section 206 disposed to enclose valve body 32b at the opposite sides and the rear, an annular end wall 207 having a coaxial through opening 208 to freely but closely pass the upper end of valve body 32b, and a forwardly directed spout cover section 209 having a depending end skirt 211 merging into downwardly diverging, planar side skirts 212 the inner ends of which merge smoothly into the side walls of tubular section 206 along axial lines extending from a point just above the front run of skirt 204 to the end wall 207. Cover member 202 is assembled with knob 164 and segment ring 162 removed by telescoping tubular section 206 rearwardly and downwardly over spout member 197 and valve body 32b to matingly engage knotched ends 205 with support plate 192 and is fixed in position by slipping segment ring 162 on to the grooved end of valve body 32b. As will be clear from FIGS. 12 and 13, the under surface of segment ring 162 bears on end wall 207 of cover member 202 to fix it in place. The opening between depending side skirts 212 of cover member 202 is then closed by insert plate 213 (FIG. 12). As seen in FIG. 12, the inner end of insert plate 213 is flanged at 214 to matingly cooperate with the upper edge of the front run of skirt 204 and the forward end of insert plate 213 along the lateral center is conically through apertured to receive a securing screw 215 threaded into tapped boss 216 provided on the tubular portion of spout member 197.

Furthermore, tubular section 206 at diametrically opposed points in alignment with valve body passages 50 is provided with through apertures 183a to provide ready access to seal assemblies 126 without any need of dismantling the faucet or removing the control operating knob. Suitable closure plates 210 are provided having a snap fit with apertures 183a to complete the trim cover.

It will also be clear from FIG. 12, that the centerset unit of FIGS. 12 and 13 is designed to accommodate the lavatory drain plug control rod 217. In this connection, tubular section 206 and the inclined bridge 191 of mounting plate 192 rearwardly of bosses 188 are provided with respective aligned passages 218 and 219 dimensioned to freely pass control rod 217 so it may be passed through the conventional rod passage 221 provided in lavatory deck plate 187 and connected to the drain control lever (not shown) conventionally provided on modern day lavatory installations.

It will be appreciated, from the description of the previous embodiments of this invention and the immediately preceeding description, that the structure of the lavatory embodiment provides the simplicity of construction, ease of operation, long useful life due to minimal frictional wear on the major moving parts, and ready accessibility to the main seals 135 more fully described in connection with the previous embodiments. It will be further appreciated that the three embodiments disclosed provide full interchangeability of the various seal structures, standardization of construction of the spindle valve members 77 and 77b, the upper ends of which can be selectively modified after basic production is accomplished to adapt them for use either in the preferred embodiment or the lavatory embodiment, and standardization of the segment ring and operating knob structures of the tub unit and lavatory unit.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A mixing faucet comprising an elongated valve body having a coaxial through bore, hot and cold water inlet passages opening through one end of said valve body and extending axially in radially spaced relation along a length of said through bore, diametrically opposed cross passages opening through the peripheral body wall and through bore adjacent one end of said through bore and intersecting said inlet passages to provide fluid communication between said inlet passages and said through bore, spout outlet porting in fluid communication with said through bore adjacent its other end including passage means opening through an external wall of said body; a spindle valve member slidably and rotatably received in said through bore with one end protruding from an end wall of said valve body and having a blind axial bore opening through and plugged at its other end and a pair of angularly related inlet passages opening through its peripheral wall disposed for axial movement toward and across said body inlet cross passages to control flow volume and rotational movement relative to said body inlet cross passages to control proportioning of the hot and cold inlet water and at least one radially directed outlet cross passage axially spaced from said angularly related inlet passages and opening into said body through bore for discharging through said spout outlet porting; respective seal assemblies disposed in the valve body diametrically opposed cross passages including respective cylindrical sleeve-like seals having inner ends contoured to sealingly abut the opposing peripheral wall of said spindle valve member in the region of said pair of angularly related inlet passages, respective seal loading means acting axially on said sleeve-like seals including biasing springs and spring abutment plugs threaded into the outer ends of said diametrically opposed cross passages, said abutment plugs providing ready access to said seals for servicing without the need to disassemble said faucet; and operating means for axially and rotatably shifting said spindle valve member fixedly secured to the protruding end of said spindle valve member whereby upon grasping said operating means said spindle valve may be selectively shifted axially and angularly between its normal full closed position and full open position to selectively control the volume flow and proportioning the mix of hot and cold flow.

2. A mixing faucet valve body assembly comprising body member defining a main cylindrical, coaxial through bore, respective hot and cold water axially directed inlet passages diametrically disposed outwardly of said main through bore and opening through one end of said valve body for attachment to supply pipes, a pair of radially directed opposing cross passages opening at their opposite ends into said main coaxial through bore and through the peripheral body wall and respectively intersecting said inlet passages to provide fluid communication between each of said inlet passages and said through bore, outlet means including a passage intersecting said main through bore at a point spaced from said one end of said body member beyond said cross passage, an annular, peripherally open groove immediately adjacent the other end of said valve body adapting said valve body to mount valve operating and retainer means; and respective seal assemblies disposed in said cross passages, including cylindrical, sleeve-like seal members spring biased inwardly toward said main through bore, said sleeve-like members at their inner ends being contoured to the curvature of said main through bore thereby adapting said sealing members to sealingly cooperate with the outer wall of a matingly ported spindle valve member fitted to said main through bore whereby fluid communication between said inlet passages and said outlet means is established through said seal members into said main bore and through said matingly ported spindle valve member to said intersecting passage of said outlet means.

3. A mixing faucet assembly comprising an elongated valve body having a coaxial through bore, hot and cold water inlet passages intersecting said through bore by means of radially directed cross passages opening at their opposite ends into said through bore and through a peripheral wall of said body, spout outlet porting in fluid communication with said through bore and including passage means opening through an external wall of said body, a spindle valve member slidably and rotatably reeived in said through bore and including flow passage means disposed for axial and rotational movement relative to said body inlet cross passages to provide fluid communication between said cross passages and said outlet porting, operating means for axially and rotatably moving said spindle valve member, respective seal assemblies disposed in said valve body cross passages including respective cylindrical sleeve-like seals having their inner ends contoured to sealingly abut the peripheral wall of said spindle valve member, respective seal loading means acting axially on said sleeve-like seals including biasing springs and spring abutment plugs threaded into the outer ends of said radially directed cross passages, and a trim cover spanning the portion of said valve body between said spout outlet porting and a point beyond said abutment plugs and providing at least one through passage dimensioned to freely pass said abutment plugs, springs and seals to permit servicing and replacement without disassembling said spindle valve member and operating means.

4. The mixing faucet assembly of claim 3 wherein said trim cover is a sleeve-like housing surrounding said valve body and having a through aperture in its side wall dimensioned to provide access to and freely pass said seal assemblies when selectively aligned therewith and being normally positioned out of alignment with said seal assemblies in a position out of view.

5. A mixing faucet comprising an elongated valve body having a coaxial through bore, radially directed hot and cold water inlet passages opening into said through bore, spout outlet porting in fluid communication with said through bore, an annular peripherally open groove adjacent one end of said valve body, a spindle valve member slidably and rotatably received in said through bore with one end protruding from said end of said valve body and having a pair of radially directed inlet passages opening through its peripheral wall disposed for axial movement toward and across said body inlet passages to control flow volume and rotational movement relative to said body inlet passages to control proportioning of the hot and cold water, an outlet passage opening into said body through bore for discharging through said spout outlet porting, and operating means supported by a pair of inverted half cup members separated along a diametrical plane to provide abutment parting surfaces oppositely notched at one end of said plane to form a through side wall passage and provided along the free ends of said side walls with respective inturned arcuate flanges rotatably mounted in said annular peripherally open body groove, said arcuate flanges and said half cup members having opposed through apertured journal bosses extending inwardly in the plane defined by their respective axially directed passage defining walls, operating lever means journalled in said journal bosses having one end protruding through said side wall passage and the other end connected through a lost motion pivotal connection to said one end of said spindle member, an inverted trim cup member enclosing said half cup members to retain them assembled and prevent disassembly of said operating lever means, said trim cup member having a side wall opening in registry with said side wall passage of said half cup members, and a securing screw passing freely through a centered passage in the end wall of said trim cup member threaded into a tapped passage in the end wall of one of said half cup members to secure said operating lever means in assembled relation.

6. The faucet of claim 5 wherein said radially directed inlet passages of said spindle valve member are angularly related and said operating lever means comprises a main body portion fixedly mounting a pivot shaft the ends of which project oppositely therefrom for endwise entry into said journal passages as said half cup members are assembled onto said valve body, a lever arm fixedly mounted in and projecting outwardly from said one end of said main body portion at an upward inclination relative to said pivot shaft; and said one protruding end of said spindle valve is diametrically slotted in a plane containing the longitudinal axis of said spindle valve and bisecting the included angle defined by planes containing the axes of said spindle valve inlet passages to angularly orient said operating lever means and said spindle valve member.

7. The faucet of claim 5 wherein said radially directed hot and cold water inlet passages of said valve body are diametrically opposed and said inturned arcuate support flange of one half cup member extends in opposite directions from its respective abutting side wall edges throughout an angle of about 30° and said annular mounting groove of said valve body is fitted with a radial stop pin protruding into said annular groove in parallel relation to the common axis of said hot and cold water inlet passages of said valve body to predetermine the opposite extreme rotational positions of said spindle valve member respectively providing full hot and full cold water discharge positions of the faucet.

8. The mixing faucet defined by claim 5 wherein at least one of said arcuate flanges rotatably mounting said cup members is discontinuous around the periphery of said body groove and said body groove is fitted with a radial stop pin protruding into said discontinuity to limit rotational movement of said operating means by abutting engagement with the oppositely disposed ends of said arcuate flanges which bound said discontinuity.

9. A mixing faucet assembly comprising an elongated valve body having a coaxial through bore, hot and cold water inlet passages opening at their opposite ends through one end of said valve body and to said through bore, spout outlet porting in fluid communication with said through bore, a spindle valve member slidably and rotatably received in said through bore and including flow passage means for providing fluid communication between said inlet passages and said outlet porting, actuating means for axially and rotatably moving said spindle valve member, and an adapter member fixedly mounted to said one end of said valve body, said adapter member being through apertured opposite said valve body water inlet passages and mounting respective hot and cold water supply pipes.

10. The faucet of claim 9, wherein said mounting for said adapter plate comprises headed screw fasteners threaded into said valve body and an elongated mounting plate which is through apertured to pass said supply pipes and provided with a marginal abutment flange formed inwardly of its opposite ends with through openings at a spacing to cooperate with the conventional hot and cold water spigot openings of a sink top or lavatory wash basin to receive depending bolt, washer and nut means for clampingly securing the mounting plate and faucet in place.

11. A mixing faucet assembly comprising a valve body having a main cylindrical through bore, radially directed hot and cold water inlet passages opening into said through bore, spout outlet porting in fluid communication with said through bore, a spindle valve member slidably and rotatably received in said through bore with one end protruding from said valve body and including flow passage means for providing fluid communication between said inlet passages and said outlet porting and actuating means for axially moving and rotating said spindle valve member comprising an adapter member fixedly connected to said valve body adjacent the end through which said spindle protrudes, said adapter member being formed to provide a cylindrical peripheral surface coaxially related to said end of said valve member and having an arcuate groove of substantial axial area therein, a knob-like actuating member having a stepped bore of decreasing diameter opening through one end, the inner smaller diameter portion of said stepped bore being dimensioned and shaped to non-rotatably receive said protruding end of said spindle valve member and the outer portion of said stepped bore being cylindrical and dimensioned to rotatably and slidingly cooperate with said cylindrical surface of said adapter member, means fixedly securing said knob-like member to said protruding end of said spindle valve member, and means provided to said knob-like actuating member and projecting radially inwardly of said outer stepped bore portion into said arcuate groove to limit the rotational and axial movement of said knob-like member and said spindle valve member relative to said adapter member and said valve body.

12. The mixing faucet assembly defined by claim 11 wherein said inner portion of said stepped bore is provided with a flat surface for non-rotatably receiving said protruding end of said spindle valve and pin means provided to said knob-like actuating member and projecting into said arcuate groove to limit said movement of the knob-like actuating member.

13. A mixing faucet comprising a valve body having a coaxial through bore, hot and cold water inlet passages opening through said valve body, a pair of radially directed cross passages opening at their opposite ends into said through bore and through the peripheral body wall, each of said cross passages respectively intersecting one of said inlet passages to provide fluid communication between said inlet passages and said through bore, spout outlet porting in fluid communication with said through bore, a spindle valve member slidably and rotatably received in said through bore and including flow passage means disposed for axial and rotational movement relative to said body inlet cross passages to provide fluid communication between said cross passages and said outlet porting, operating means for axially and rotatably moving said spindle valve member, respective seal assemblies disposed in said cross passages including respective cylindrical sleeve-like seals having their inner ends contoured to sealingly abut the peripheral wall of said spindle valve member, respective seal loading means acting axially on said sleeve-like seals including biasing springs having their inner ends threadedly meshed with helically spaced protuberances formed on said sleeve-like seals to effect a unitary seal assembly and spring abutment plugs threaded into the outer ends of said radially directed cross passages to provide ready access to said unitary seal assemblies for removal and replacement without disassembling said spindle valve member and operating means.

* * * * *

PO-1050
(5/69)

UNITED STATES PATENT OFFICE
CERTIFICATE OF CORRECTION

Patent No. 3,807,453      Dated April 30, 1974

Inventor(s) John A. Dom, Clarence B. Hindman, Pericles A. Argyris, John J. Kramer It is certified that error appears in the above-identified patent and that said Letters Patent are hereby corrected as shown below:

Column 11, Line 65, delete "delmit" and substitute --delimit--.

Column 12, Line 18, delete "sets" and substitute --seats--.

Column 16, Line 30, delete "machine of macine" and substitute --heads of machine--.

Line 53, after "valve" insert --body--.

Column 17, Line 6, delete "dircted" and substitute --directed--.

Line 14, delete "assembly" and substitute --member--.

Signed and sealed this 17th day of December 1974.

(SEAL)
Attest:

McCOY M. GIBSON JR.
Attesting Officer

C. MARSHALL DANN
Commissioner of Patents